United States Patent
Kwak et al.

(10) Patent No.: US 11,968,704 B2
(45) Date of Patent: Apr. 23, 2024

(54) METHOD AND DEVICE FOR CARRYING OUT PREEMPTION OPERATION IN NR V2X

(71) Applicant: LG ELECTRONICS INC., Seoul (KR)

(72) Inventors: Kyuhwan Kwak, Seoul (KR); Hanbyul Seo, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 171 days.

(21) Appl. No.: 17/290,981

(22) PCT Filed: Sep. 3, 2019

(86) PCT No.: PCT/KR2019/011301
§ 371 (c)(1),
(2) Date: May 3, 2021

(87) PCT Pub. No.: WO2020/096189
PCT Pub. Date: May 14, 2020

(65) Prior Publication Data
US 2022/0039097 A1 Feb. 3, 2022

Related U.S. Application Data

(60) Provisional application No. 62/758,486, filed on Nov. 9, 2018.

(51) Int. Cl.
*H04W 72/40* (2023.01)
*H04W 28/08* (2023.01)
(Continued)

(52) U.S. Cl.
CPC ....... *H04W 72/56* (2023.01); *H04W 28/0875* (2020.05); *H04W 28/16* (2013.01);
(Continued)

(58) Field of Classification Search
CPC ............... H04W 4/38–48; H04W 4/80; H04W 4/30–48
See application file for complete search history.

(56) References Cited

U.S. PATENT DOCUMENTS

2013/0148566 A1\* 6/2013 Doppler ................ H04W 72/30
370/312
2016/0183276 A1 6/2016 Marinier et al.
(Continued)

FOREIGN PATENT DOCUMENTS

WO 2018175553 9/2018

OTHER PUBLICATIONS

PCT International Application No. PCT/KR2019/011301, International Search Report dated Dec. 12, 2019, 4 pages.
(Continued)

*Primary Examiner* — San Htun
(74) *Attorney, Agent, or Firm* — LEE, HONG, DEGERMAN, KANG & WAIMEY

(57) ABSTRACT

Provided are a method for a terminal stopping information transmission in a wireless communication system, and a device supporting same. The method may comprise the steps of: receiving first power control information for setting a transmission power to zero; and stopping information transmission on a resource on the basis of the first power control information.

18 Claims, 25 Drawing Sheets

BS(e.g. eNB or gNB)

UE 1    UE 2

(51) Int. Cl.
- *H04W 28/16* (2009.01)
- *H04W 28/26* (2009.01)
- *H04W 52/28* (2009.01)
- *H04W 72/04* (2023.01)
- *H04W 72/044* (2023.01)
- *H04W 72/25* (2023.01)
- *H04W 72/53* (2023.01)
- *H04W 72/543* (2023.01)
- *H04W 72/56* (2023.01)
- *H04W 52/54* (2009.01)

(52) U.S. Cl.
CPC ......... *H04W 28/26* (2013.01); *H04W 52/281* (2013.01); *H04W 72/04* (2013.01); *H04W 72/046* (2013.01); *H04W 72/0473* (2013.01); *H04W 72/25* (2023.01); *H04W 72/40* (2023.01); *H04W 72/53* (2023.01); *H04W 72/543* (2023.01); *H04W 52/54* (2013.01)

(56) References Cited

U.S. PATENT DOCUMENTS

| | | | |
|---|---|---|---|
| 2016/0234855 A1* | 8/2016 | Panteleev | H04W 60/00 |
| 2018/0027559 A1* | 1/2018 | Iyer | H04L 5/0058 370/329 |
| 2018/0049220 A1* | 2/2018 | Patil | H04W 72/27 |
| 2018/0077552 A1* | 3/2018 | Lee | H04W 4/08 |
| 2018/0176892 A1 | 6/2018 | Kim et al. | |
| 2018/0206260 A1* | 7/2018 | Khoryaev | H04W 72/1289 |
| 2019/0306801 A1* | 10/2019 | Zhou | H04W 52/44 |

OTHER PUBLICATIONS

Intel Corporation, "Enhancements of NR and LTE Uu Link to Control NR Sidelink," 3GPP TSG RAN WG1 Meeting #94, R1-1808699, Aug. 2018, 9 pages, Best Available Date: Aug. 20-24, 2018.

Samsung, "Remaining details on congestion control," 3GPP TSG RAN WG1 #88, R1-1702866, Feb. 2017, 6 pages, Best Available Date: Feb. 13-17, 2017.

* cited by examiner

METHOD AND DEVICE FOR CARRYING OUT PREEMPTION OPERATION IN NR V2X

CROSS-REFERENCE TO RELATED APPLICATIONS

[0] This application is the National Stage filing under 35 U.S.C. 371 of International Application No. PCT/KR2019/011301, filed on Sep. 3, 2019, which claims the benefit of U.S. Provisional Application No. 62/758,486, filed on Nov. 9, 2018, the contents of which is incorporated by reference herein in its entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g., a bandwidth, transmission power, and so on) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Objects

Meanwhile, when communication between UEs is performed, in order to transmit information having a higher priority according to QoS requirements corresponding to transmitted information, it may be necessary to deprive or preempt an opportunity to transmit information having a lower priority. For example, the base station or other UEs may perform pre-emption for resource(s) being used by a specific UE or reserved by a specific UE. As another example, a UE may perform pre-emption in order to reserve resource(s) to be used by the UE. In the above case, it is necessary to propose a method for instructing/signaling, by the base station or other UEs, to the UE so that the UE does not perform information transmission based on resource(s) being used by the UE or resource(s) reserved by the UE.

Technical Solutions

In an embodiment, provided is a method for stopping, by a first user equipment (UE), transmission of information in a wireless communication system. The method may comprise: receiving first power control information; and stopping the transmission of the information on a resource based on the first power control information.

In another embodiment, provided is a method for stopping, by a base station, transmission of information by a user equipment (UE) in a wireless communication system. The method may comprise: transmitting power control information to the UE, wherein, based on the power control information, the transmission of the information is stopped on a resource by the UE.

Effects of the Disclosure

Resource(s) for transmitting high-priority information can be secured.

DESCRIPTION OF EXEMPLARY EMBODIMENTS

In this document, the term "I" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
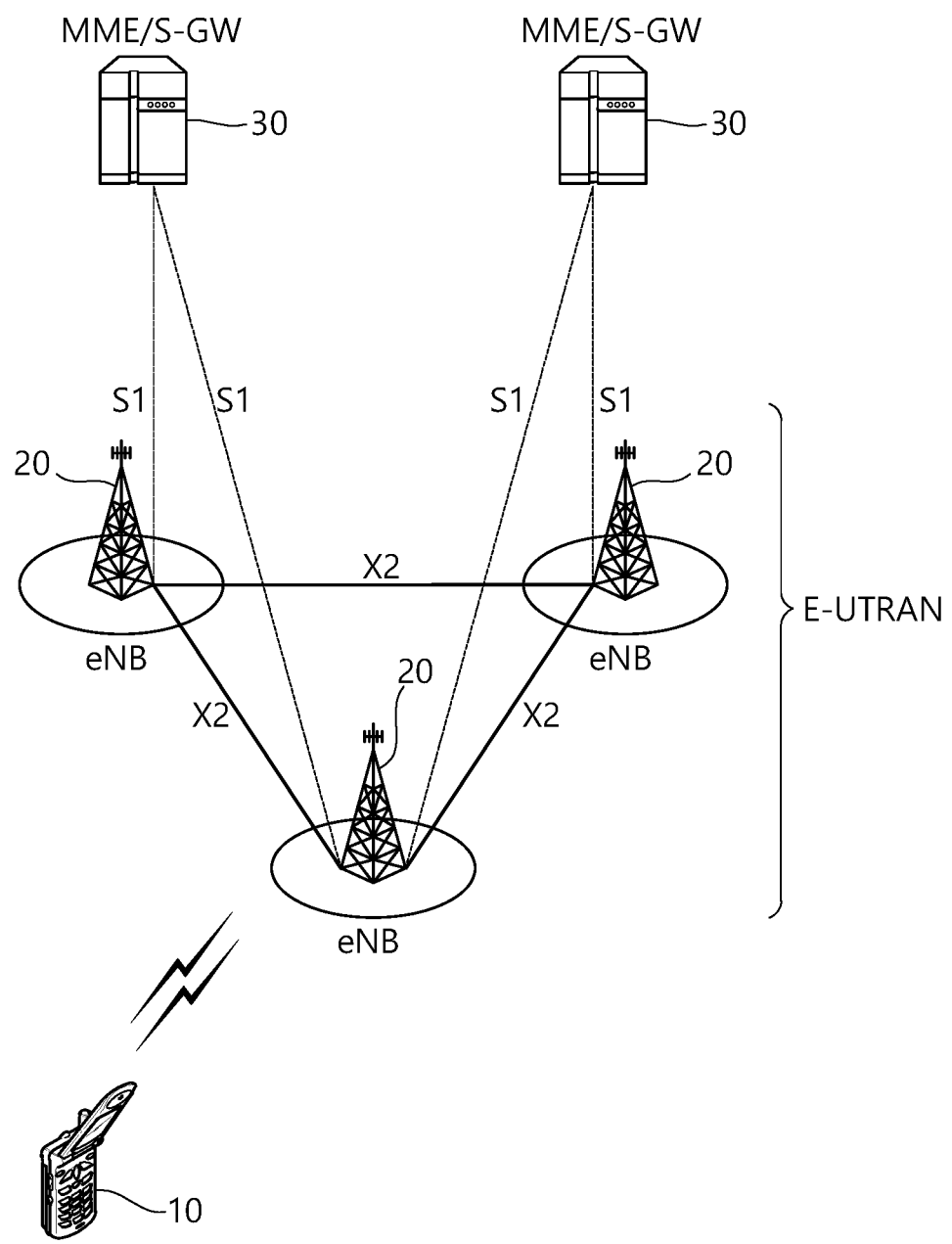
FIG. 1 shows a structure of an LTE system to which an exemplary embodiment of the present disclosure can be applied.

FIG. 1 shows a structure of an LTE system to which an exemplary embodiment of the present disclosure can be applied. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
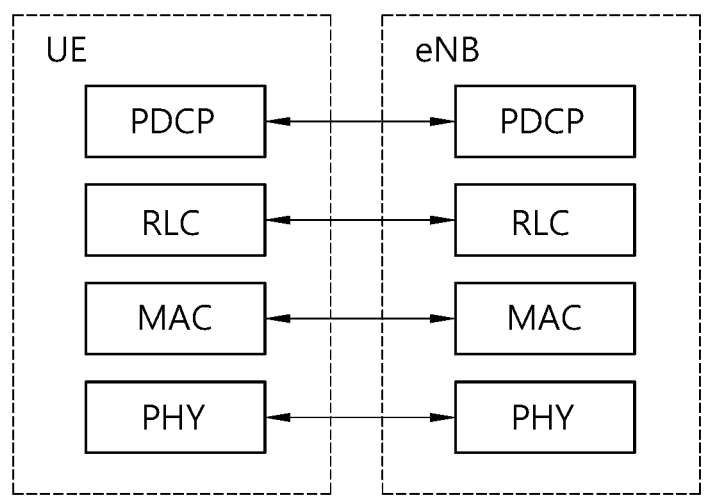
FIG. 2 shows a radio protocol architecture of a user plane to which an exemplary embodiment of the present disclosure can be applied.
Figure 3:
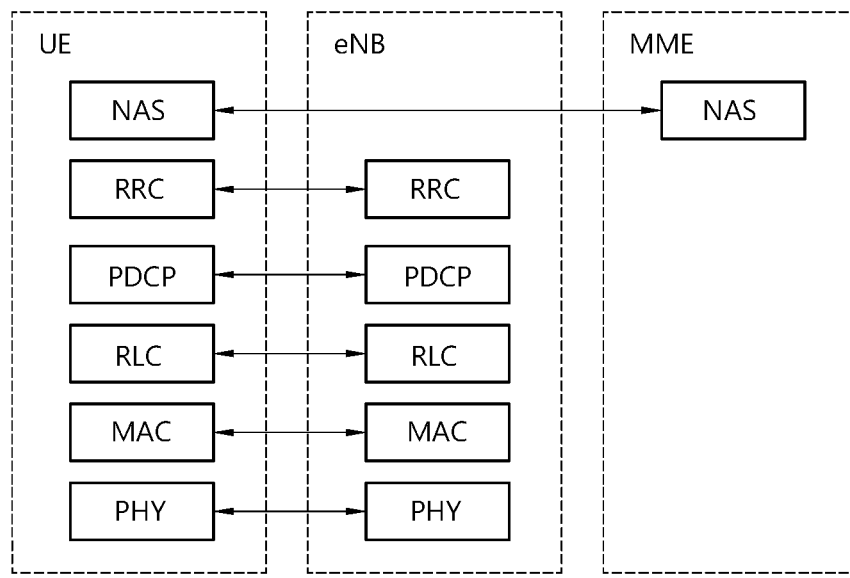
FIG. 3 shows a radio protocol architecture of a control plane to which an exemplary embodiment of the present disclosure can be applied.

FIG. 2 shows a radio protocol architecture of a user plane to which an exemplary embodiment of the present disclosure can be applied. FIG. 3 shows a radio protocol architecture of a control plane to which an exemplary embodiment of the present disclosure can be applied. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU. In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
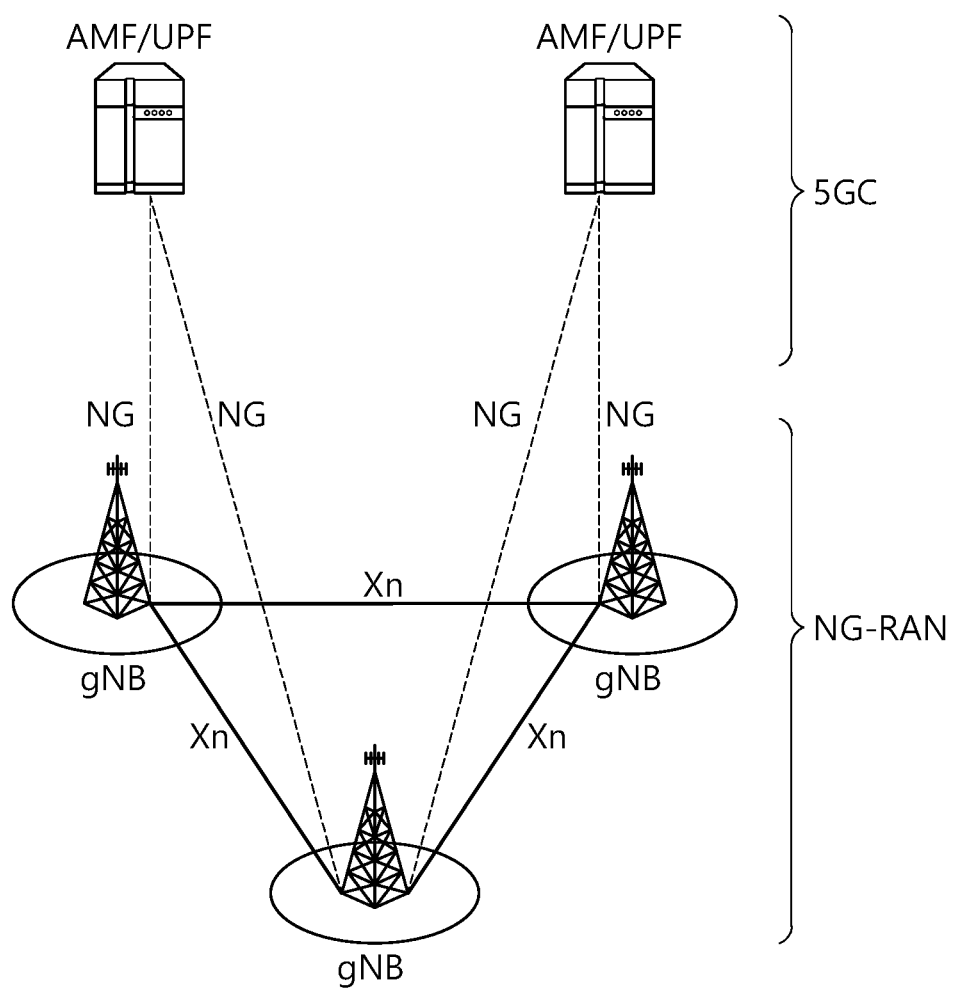
FIG. 4 shows a structure of an NR system to which an exemplary embodiment of the present disclosure can be applied.

FIG. 4 shows a structure of an NR system to which an exemplary embodiment of the present disclosure can be applied.

Referring to FIG. 4, an NG-RAN may include a gNB and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
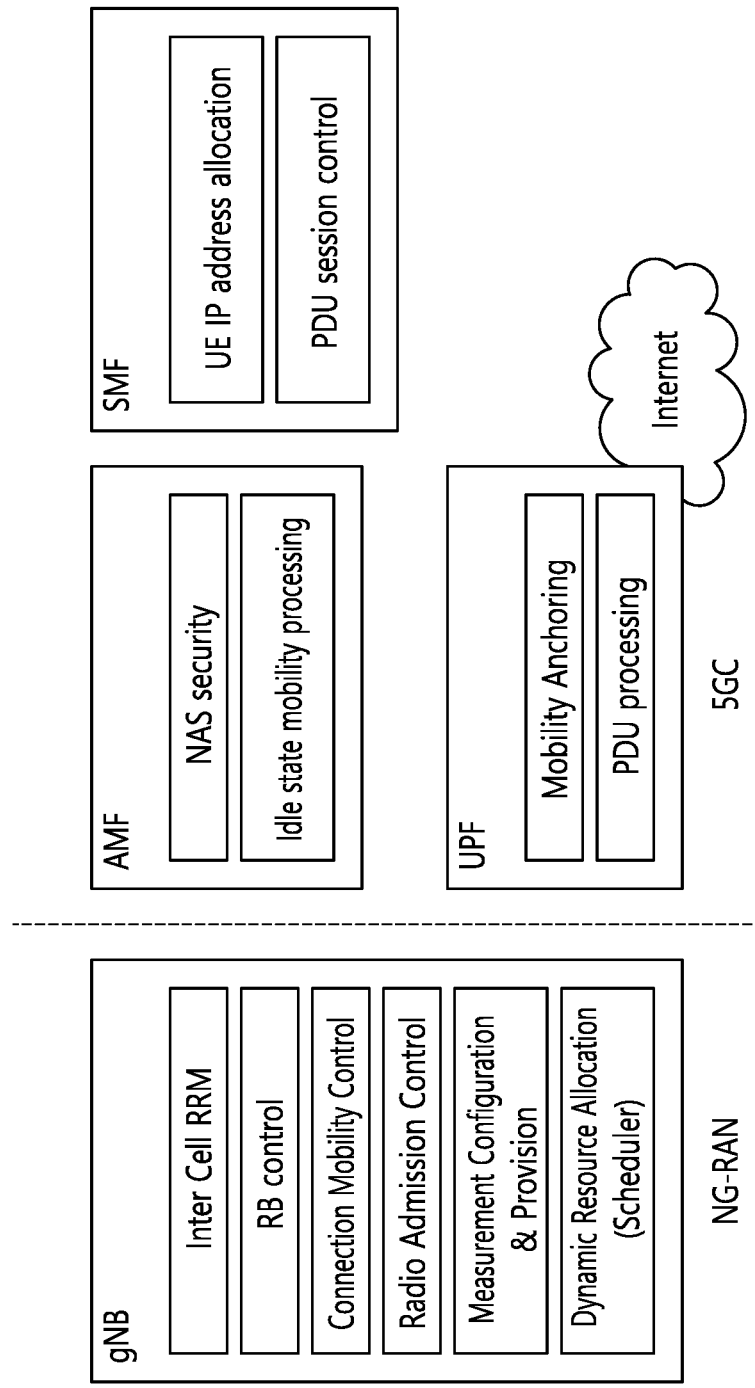
FIG. 5 shows a functional division between an NG-RAN and a 5GC to which an exemplary embodiment of the present disclosure can be applied.

FIG. 5 shows a functional division between an NG-RAN and a 5GC to which an exemplary embodiment of the present disclosure can be applied.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, Idle state mobility processing, and so on. A UPF may provide functions, such as Mobility Anchoring, PDU processing, and so on. A Session Management Function (SMF) may provide functions, such as user equipment (UE) IP address allocation, PDU session control, and so on.

Meanwhile, a new RAT system such as NR may use an OFDM transmission scheme or a transmission scheme similar thereto. The new RAT system may follow OFDM parameters different from OFDM parameters of the LTE. Alternatively, the new RAT system may follow the existing LTE/LTE-A numerology, but may have a larger system bandwidth (e.g., 100 MHz). Alternatively, one cell may support a plurality of numerologies. That is, UEs operating based on different numerologies may coexist in one cell.

Figure 6:
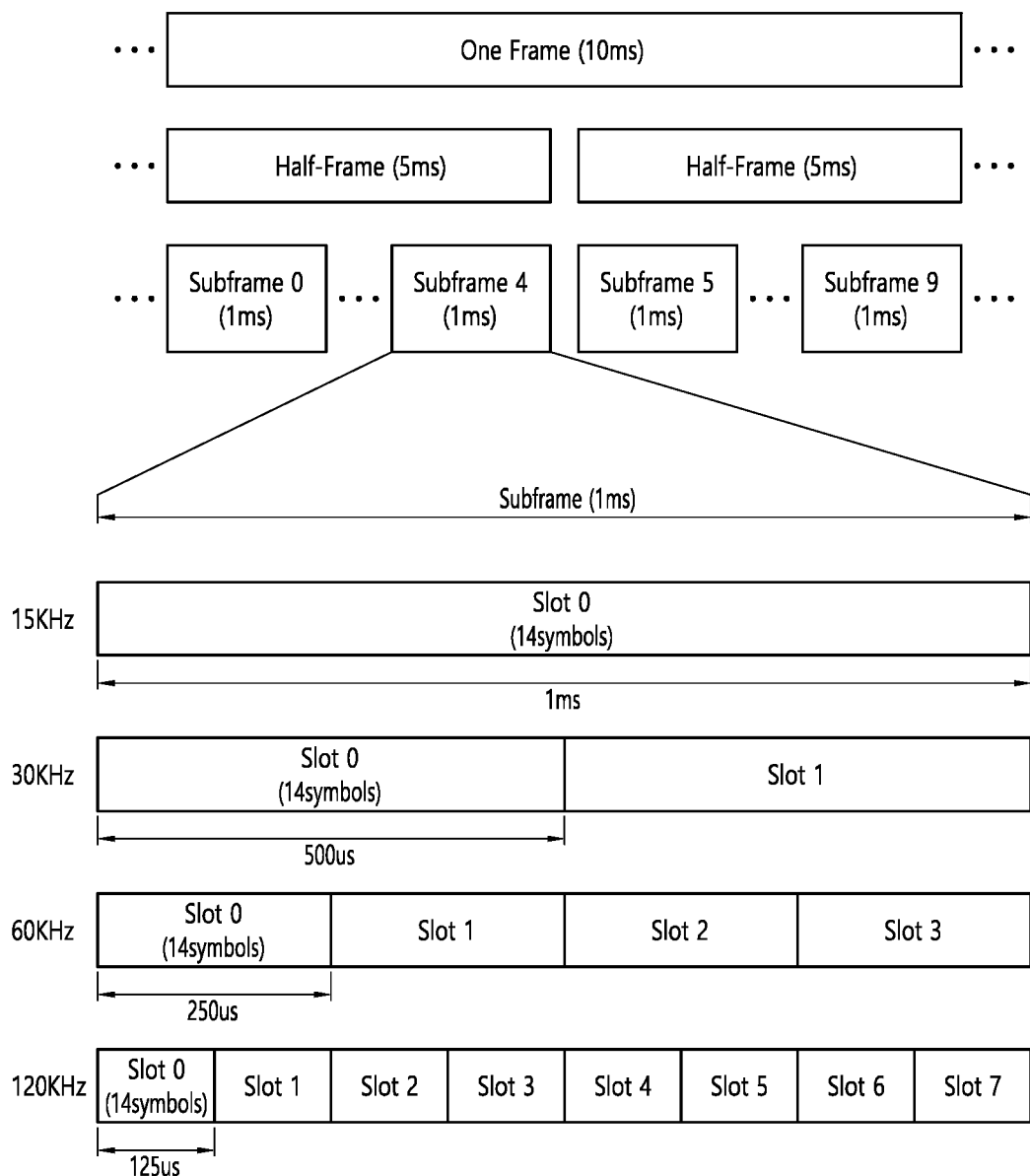
FIG. 6 shows a structure of a radio frame of an NR to which an exemplary embodiment of the present disclosure can be applied.

FIG. 6 shows a structure of a radio frame of an NR to which an exemplary embodiment of the present disclosure can be applied.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) $i_n$ accordance with an SCS configuration ($\mu$), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 kHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 7:
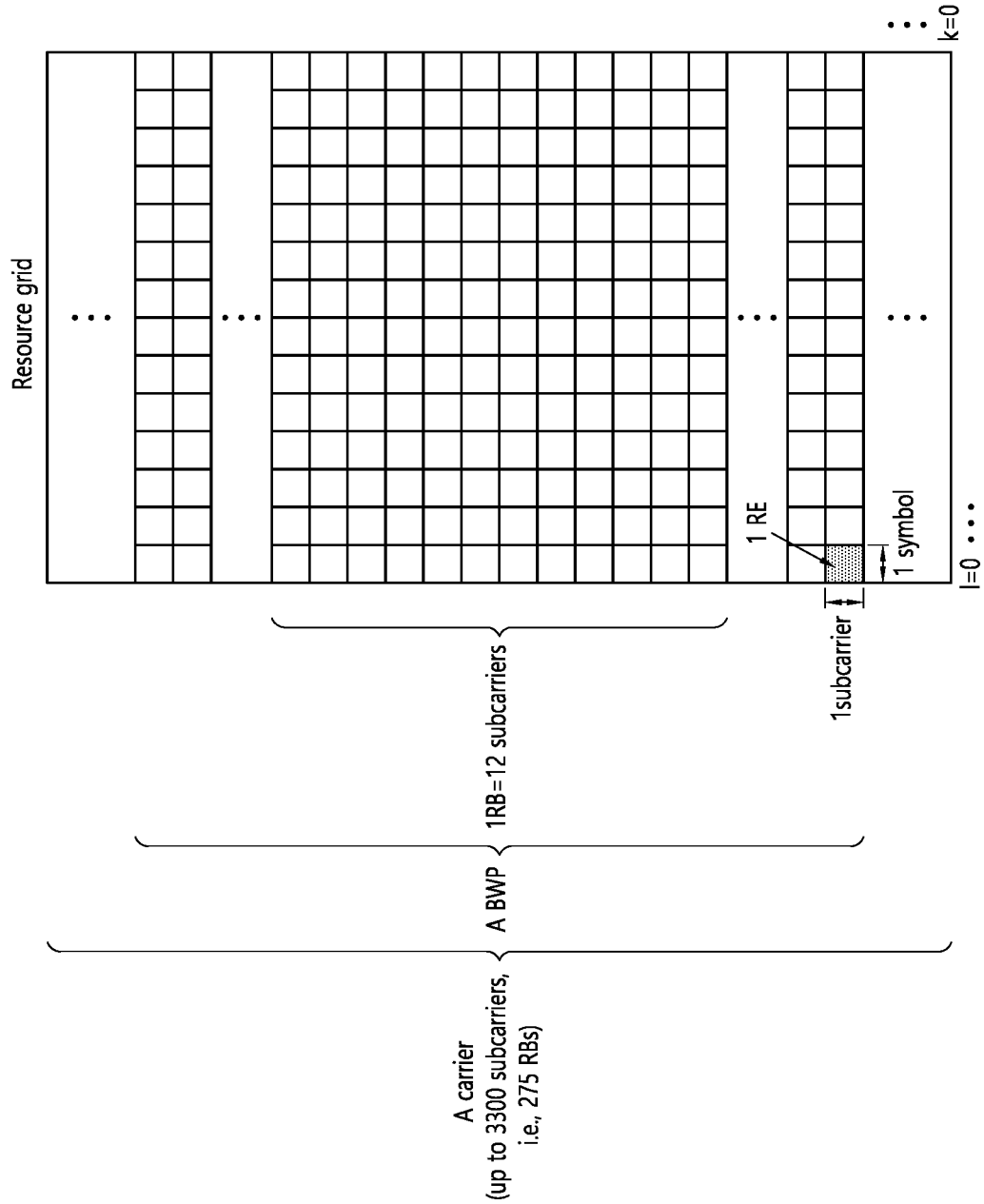
FIG. 7 shows a structure of a slot of an NR frame to which an exemplary embodiment of the present disclosure can be applied.

FIG. 7 shows a structure of a slot of an NR frame to which an exemplary embodiment of the present disclosure can be applied.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, V2X or sidelink communication will be described in detail.

Figure 8:
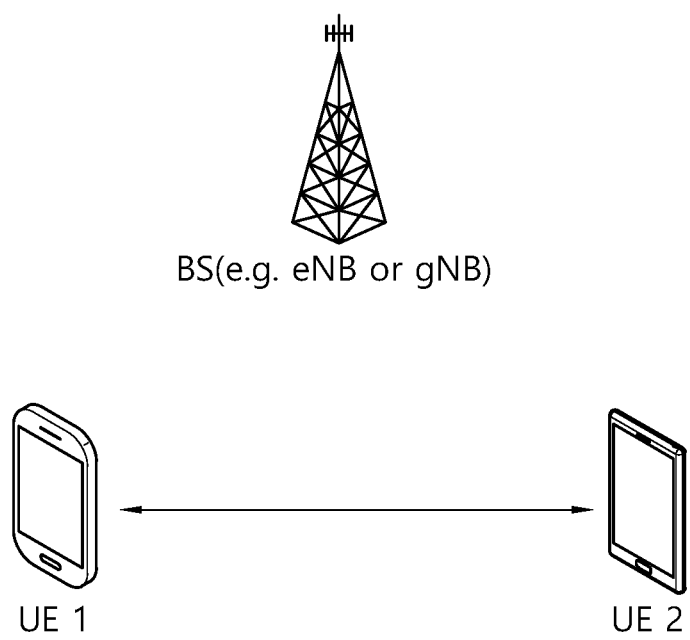
FIG. 8 shows UEs performing V2X or sidelink communication to which an exemplary embodiment of the present disclosure can be applied.

FIG. 8 shows UEs performing V2X or sidelink communication to which an exemplary embodiment of the present disclosure can be applied.

Referring to FIG. 8, in V2X/sidelink communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a sidelink signal by using the corresponding resource unit. User equipment 2 (UE2), which corresponds to a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its sidelink signal transmission.

Figure 9:
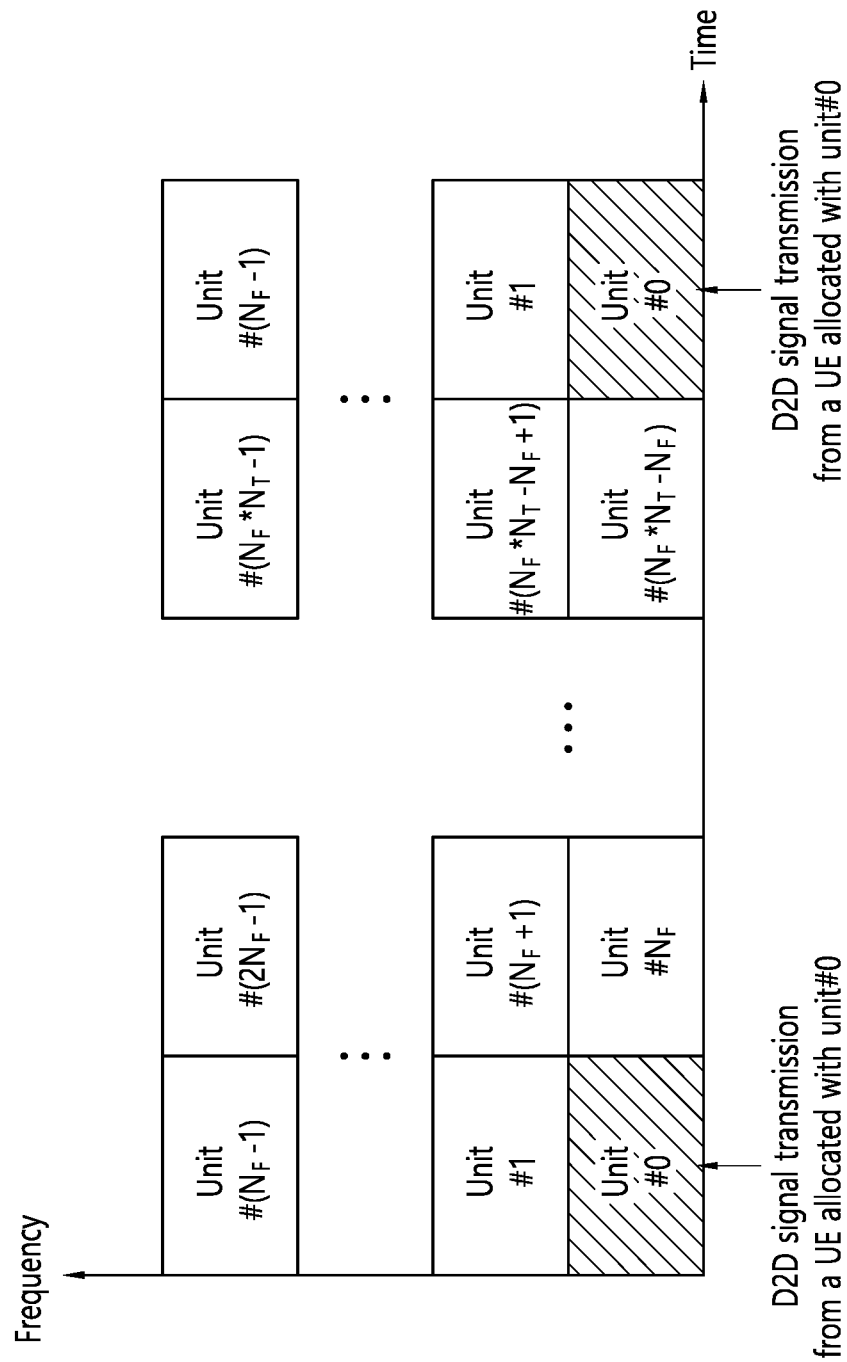
FIG. 9 shows an exemplary configuration of a resource unit to which an exemplary embodiment of the present disclosure can be applied.

FIG. 9 shows an exemplary configuration of a resource unit to which an exemplary embodiment of the present disclosure can be applied.

Referring to FIG. 9, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 9 shows an example of a case where the corresponding resource pool is repeated at a cycle of $N_T$ number of subframes.

As shown in FIG. 9, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may be a signal including information, such as a position of a resource that is used for the transmission of a sidelink data channel, a Modulation and Coding Scheme (MCS) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may be a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel. In other words, REs that were used for transmitting SA information within a separate resource unit of the SA resource pool may still be used for transmitting sidelink data from the resource pool of a sidelink data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the base station, a transmitting power intensity (or level) of a sidelink UE, and so on.

Figure 10:
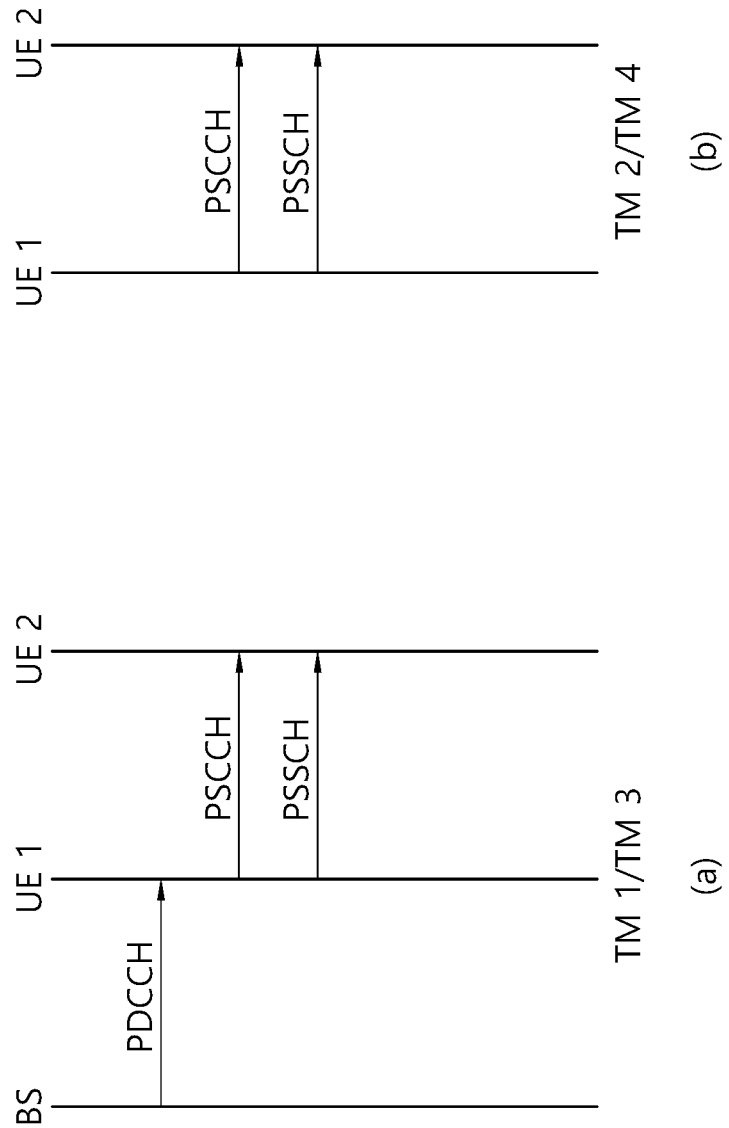
FIG. 10 shows UE operations according to a transmission mode (TM) being related to sidelink/V2X communication to which an exemplary embodiment of the present disclosure can be applied.

FIG. 10 shows UE operations according to a transmission mode (TM) being related to sidelink/V2X communication to which an exemplary embodiment of the present disclosure can be applied.

(a) of FIG. 10 represents UE operations being related to transmission mode 1 or transmission mode 3, and (b) of FIG. 10 represents UE operations being related to transmission mode 2 or transmission mode 4.

Referring to (a) of FIG. 10, in transmission modes 1/3, the base station performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). Transmission mode 1 may be applied to a sidelink communication, and transmission mode 3 may be applied to a V2X communication.

Referring to (b) of FIG. 10, in transmission modes 2/4, the UE may schedule resources on its own. More specifically, transmission mode 2 may be applied to a sidelink communication, and the UE may select a resource from a predetermined resource pool on its own and may then perform sidelink operations. Transmission mode 4 may be applied to a V2X communication, and the UE may carry out a sensing/SA decoding procedure, and so on, and select a resource within a selection window on its own and may then perform V2X operations. After transmitting the SCI to UE2 via PSCCH, UE1 may transmit SCI-based data via PSSCH. Hereinafter, the transmission mode may be abbreviated to mode.

Meanwhile, when communication between UEs is performed, in order to transmit information having a higher priority according to QoS requirements corresponding to transmitted information, it may be necessary to deprive or preempt an opportunity to transmit information having a lower priority. In the present disclosure, pre-emption may mean pre-occupying in time as well as pre-occupying in priority. For example, pre-emption may be applied to a variety of scenarios.

For example, the base station or other UEs may perform pre-emption for resource(s) being used by a specific UE or reserved by a specific UE. For example, the base station or other UEs may dynamically or semi-statically indicate the pre-emption to the specific UE through higher layer signaling and/or physical layer signaling, and through this, the pre-emption may be performed. As another example, a UE may perform pre-emption in order to reserve resource(s) to be used by the UE. For example, the UE may reserve resource(s) to be used by the UE by requesting the base station.

In the above case, it is necessary to consider how a first apparatus indicates/signals to a second apparatus so that the second apparatus does not perform information transmission based on resource(s) being used by the second apparatus or resource(s) reserved by the second apparatus. For example, the first apparatus may be a base station, and the second apparatus may be a UE. For example, the first apparatus may be a first UE, and the second apparatus may be a second UE. For example, the first apparatus may be a UE, and the second apparatus may be a base station. Hereinafter, according to an embodiment of the present disclosure, a method for informing, by a base station or a UE, a specific UE of pre-emption operation and an apparatus supporting the same will be described. In this document, the pre-emption operation may mean an operation not to transmit information (related to uplink or sidelink). For example, an operation in which the base station informs the specific UE of the pre-emption operation may mean an operation in which the base station instructs the specific UE to stop transmission or not to perform transmission. For convenience of explanation, an embodiment in which the base station informs the UE of the pre-emption operation is mainly described, but the technical idea of the present disclosure is not limited thereto. According to an embodiment of the present disclosure, the UE may inform other UEs of the pre-emption operation. Alternatively, in order for the UE to reserve resource(s) to be used by the UE, the UE may inform the base station of the pre-emption operation.

In the present disclosure, a proposed method and/or an embodiment may be regarded as a single proposed method, but a combination between each proposed method and/or the embodiment may also be regarded as a new method. Also, it goes without saying that the proposed method is not limited to a specific embodiment and is not limited to a specific system disclosed in the present disclosure. All parameters, operations, a combination between each parameter and/or each operation, whether the corresponding parameters and/or the operations are applied, and/or whether a combination between each parameter and/or each operation is applied may be (pre-)configured through higher layer signaling and/or physical layer signaling from the base station to the UE, or may be pre-defined in a system. For example, the higher layer signaling may be application layer signaling, L3 signaling, L2 signaling, and so on. For example, physical layer signaling may be L1 signaling. Also, each of the proposed methods of the present disclosure may be defined as one operation mode, and the base station may (pre-)configure one of them to the UE through higher layer signaling and/or physical layer signaling. The base station may allow the UE to operate according to the corresponding mode. In the present disclosure, the transmission time interval (TTI) may be a unit of various lengths such as a sub-slot/a slot/a subframe, or a basic unit that is a basic transmission unit, and so on. In the present disclosure, the UE may be various types of devices such as a vehicle, a pedestrian UE, and so on. Also, in the present disclosure, matters related to operation of a UE, a base station, and/or a road side unit (RSU) may not be limited to each device type, and may be applied to different types of devices. For example, in the present disclosure, a matter described as an operation of a base station may be applied to an operation of a UE.

According to an embodiment of the present disclosure, the pre-emption operation may be informed to an apparatus (e.g., a UE or a base station) based on power control signaling. Hereinafter, for convenience of explanation, a method for indicating the pre-emption operation based on the power control signaling is mainly described, but the technical idea of the present disclosure is not limited to the power control signaling. For example, the pre-emption operation may be informed to an apparatus (e.g., a UE or a base station) based on other signaling defined in the system. Alternatively, for example, the pre-emption operation may be informed to an apparatus (e.g., a UE or a base station) based on separate signaling indicating the pre-emption operation. For this, the separate signaling indicating the pre-emption operation may be defined.

Figure 11:
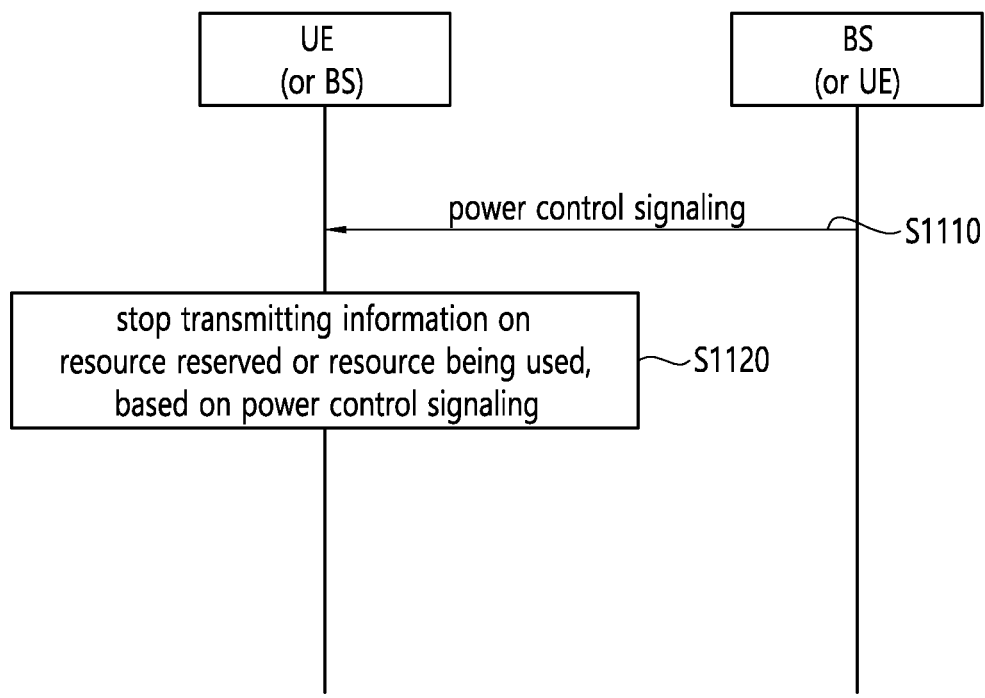
FIG. 11 shows a procedure in which the base station informs the UE of the pre-emption operation based on the power control signaling according to an embodiment of the present disclosure.

FIG. 11 shows a procedure in which the base station informs the UE of the pre-emption operation based on the power control signaling according to an embodiment of the present disclosure.

Referring to FIG. 11, in step S1110, the UE may receive the power control signaling from the base station. In this document, the power control signaling may be referred to as power control information.

In step S1120, if a value indicated by the power control signaling corresponds to information for setting an absolute value of power to zero, the UE receiving the power control signaling may not perform information transmission based on resource(s) being used by the UE or resource(s) reserved by the UE. Accordingly, the UE may perform the pre-emption operation based on the power control signaling. That is, if the UE receives the power control signaling for setting the transmission power to zero, the UE may stop transmitting information based on resource(s) being used by the UE or resource(s) reserved by the UE.

According to an embodiment of the present disclosure, in case that the pre-emption is performed using the power control signaling, the application timing of the power control signaling may be differently applied according to a configured value indicated by the power control signaling.

Figure 12:
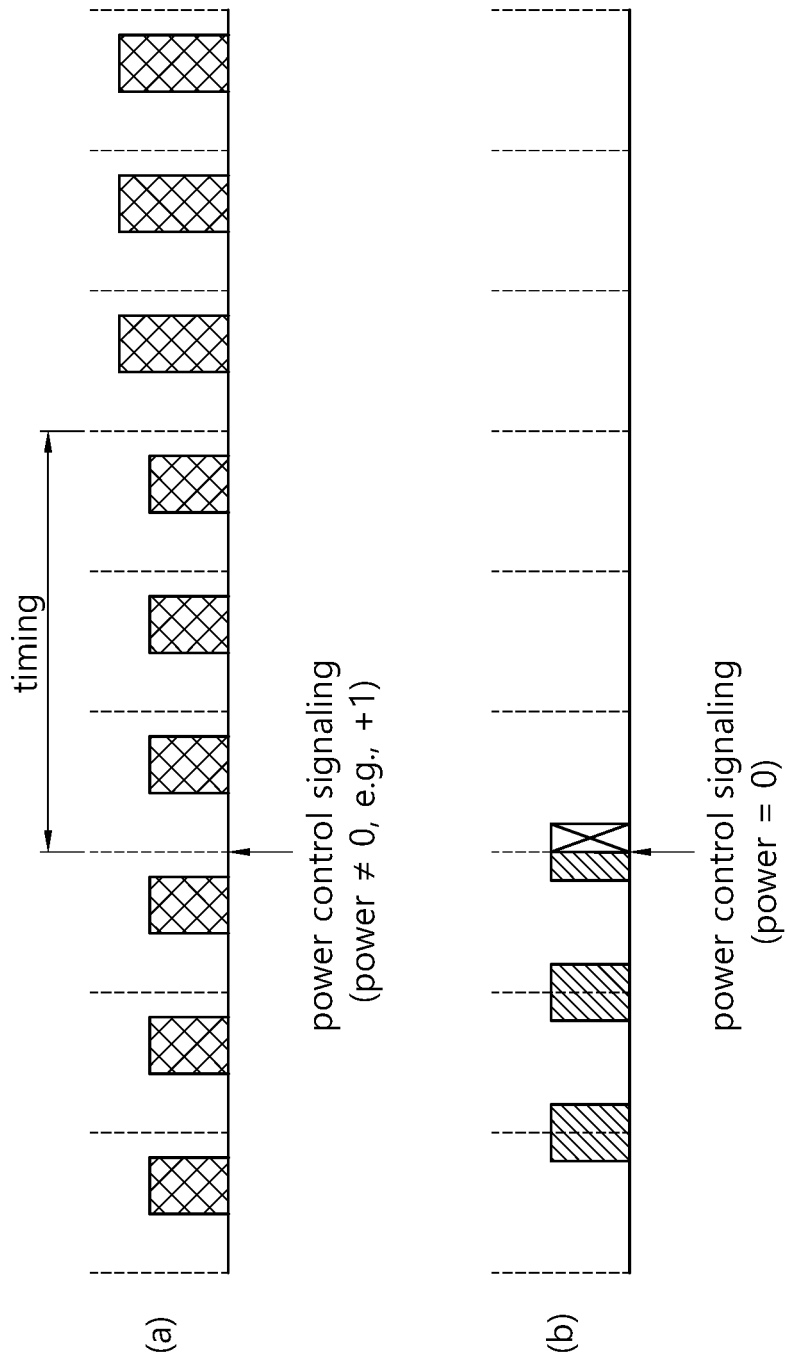
FIG. 12 shows an example in which the power control signaling is applied at different times according to an embodiment of the present disclosure.

FIG. 12 shows an example in which the power control signaling is applied at different times according to an embodiment of the present disclosure.

Referring to (a) of FIG. 12, if the UE receives a value different from the information (e.g., information for setting the absolute value of power to zero) through the power control signaling, the UE may perform a power control operation according to the different value indicated through the power control signaling. In addition, in this case, the power control signaling may be applied at a pre-defined timing. For example, the UE may perform the power control operation based on the power control signaling at the point in time when the pre-defined time elapses. For example, the timing or the time may be pre-defined in the system. Alternatively, for example, the timing or the time may be transmitted from the base station to the UE through higher layer signaling and/or physical layer signaling. Alternatively, for example, the timing or the time may be transmitted from other UEs to the UE through higher layer signaling and/or physical layer signaling.

Referring to (b) of FIG. 12, if the UE receives information for setting the absolute value of power to zero through the power control signaling, the UE may perform an operation corresponding to the information. For example, for the pre-emption operation, the UE may perform an operation of stopping information transmission based on resource(s) being used by the UE or resource(s) reserved by the UE. In addition, in this case, the power control signaling may be applied at a timing different from the pre-defined timing. For example, the power control signaling may be applied at a time point earlier than a pre-defined timing. For example, the UE may stop transmitting information immediately upon receiving information for setting the absolute value of power to zero.

In case that the UE is informed by the base station to transmit signal(s) based on specific power, in order for the UE to perform an operation of generating transmission signal(s) according to the specific power, a certain processing time may be required for the UE. However, in case of the pre-emption operation, a separate signal generation process, etc., may not be required. That is, since the pre-emption operation is an operation of simply stopping transmission, for example, even though a preparation time is shorter compared to the operation of generating the transmission signal(s) according to the specific power, implementation may be possible. According to an embodiment of the present disclosure, the UE may stop transmitting information immediately upon receiving information for setting the absolute value of power to zero. Through this, a more rapid preemption operation may be possible. According to an embodiment of the present disclosure, if the UE currently performing transmission receives the power control signaling for setting the absolute value of power to zero, through a carrier aggregation (CA) operation, etc., the UE may stop the transmission immediately.

According to an embodiment of the present disclosure, the above operation may be applied to all cases where a value indicated by the power control signaling is an accumulated value or a difference value. If the difference value is indicated by the power control signaling, a state (e.g., a state corresponding to information for setting the absolute value of power to zero) may be separately defined for the operation. Thereafter, if the difference value is indicated to cancel the pre-emption operation, the difference value may be applied based on the absolute value of power applied immediately before the pre-emption operation is applied.

According to an embodiment of the present disclosure, the proposed operation may be applied in a group unit. For example, like DCI format 3/3A defined in the LTE system, transmit power control (TPC) configuration may be indicated in the group unit consisting of a plurality of UEs. Even in this case, the proposed operation may be applied.

For example, in case that the base station or other UEs transmits the power control signaling to a plurality of UEs through physical layer signaling and/or higher layer signaling, the base station or other UEs may apply the pre-emption operation to a field corresponding to at least one UE that have reserved or is using resource(s) to be preempted. For example, the base station or other UEs may transmit information for setting the absolute value of power to zero, through the field. Accordingly, the base station or other UEs may indicate the pre-emption operation to at least one UE that have reserved or is using resource(s) to be preempted. In addition, at least one UE that have reserved or is using resource(s) in which the base station or other UEs desires to preempt may perform the pre-emption operation.

Figure 13:
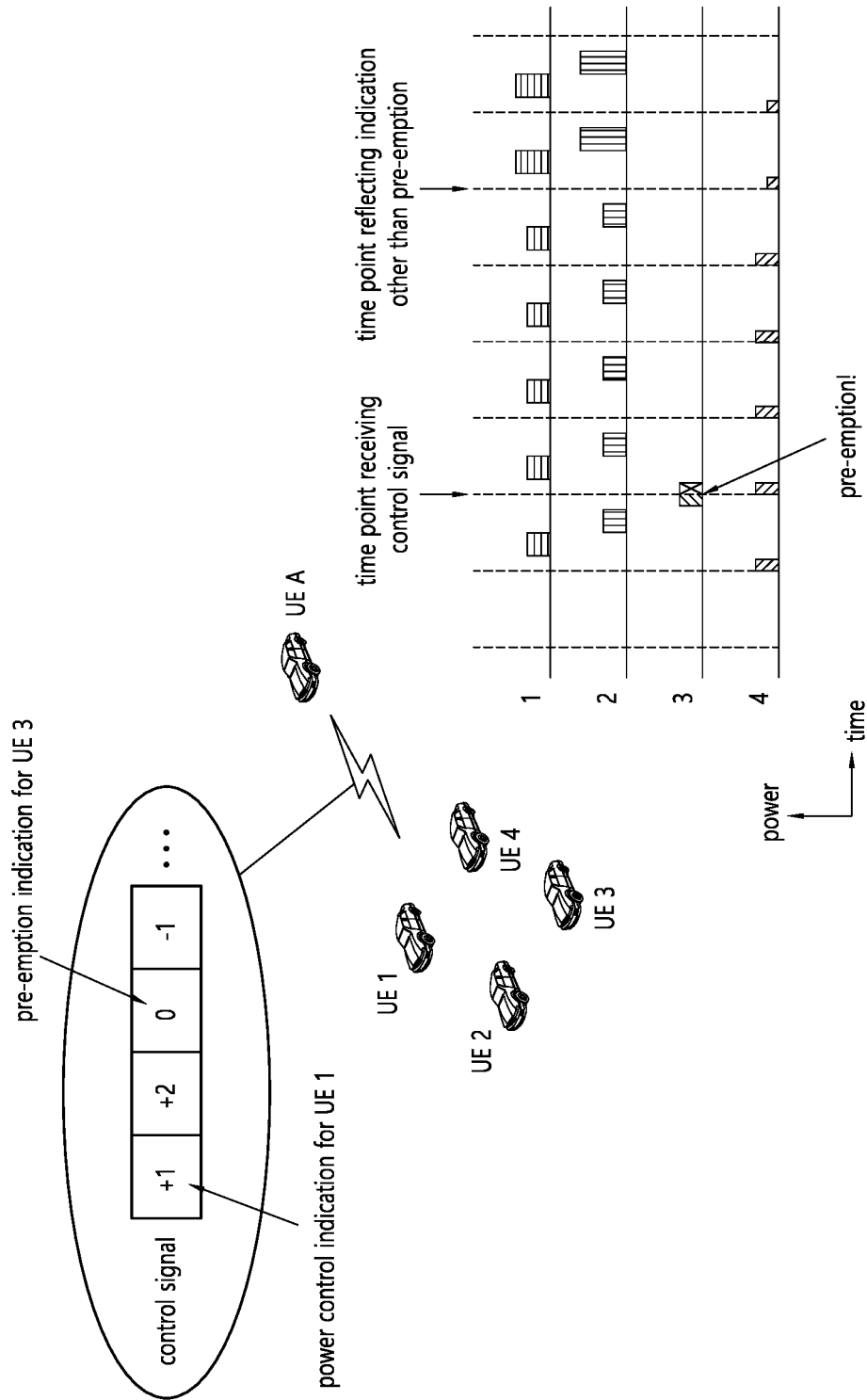
FIG. 13 shows an example in which the UE informs one or more other UEs of the pre-emption operation in groupcast transmission according to an embodiment of the present disclosure.

FIG. 13 shows an example in which the UE informs one or more other UEs of the pre-emption operation in groupcast transmission according to an embodiment of the present disclosure.

Referring to FIG. 13, in case that groupcast transmission is performed in a group including a plurality of UEs, the UE may inform one or more specific UEs of the pre-emption operation through higher layer signaling and/or physical layer signaling. For example, in groupcast transmission between UEs, when the UE transmits control signaling indicating power control to other UEs, the UE may inform one or more specific UEs of the pre-emption operation together. In this case, as already proposed in this document, the application timing of the indication for the power control and the indication for the pre-emption operation may be different from each other. In the embodiment of FIG. 13, UE A may instruct UE 3 to perform the pre-emption operation through higher layer signaling and/or physical layer signaling. Specifically, when UE A transmits the control signaling indicating the power control to UE 1-UE 4, UE A may also inform UE 3 of the preemption operation. In this case, a timing at which the power control operation for UE 1, UE 2 and UE 4 is applied may be different from a timing at which the preemption operation for UE 3 is applied.

According to the proposed embodiment of the present disclosure, the pre-emption operation may be performed for one or more UEs among a plurality of UEs belonging to a specific group. In addition, in this case, based on signaling indicated in a unit of a group including a plurality of UEs, operations for other UEs other than the UE instructed to perform the pre-emption operation may also be controlled. The signaling indicated in the unit of the group may be composed of one or more fields corresponding to the indication for each UE in the group. For example, if the pre-emption operation is informed to a specific UE in the group including a plurality of UEs through group unit information, one or more UEs belonging to the corresponding group may know indication information for other UEs by decoding the group unit information. In the embodiment of FIG. 13, UE 1, UE 2 and UE 4 may decode the group unit information, and UE 1, UE 2 and UE 4 may know that the pre-emption operation will be performed for UE 3. Therefore, if the pre-emption operation for a specific UE is informed, one or more UEs belonging to the corresponding group may not perform decoding for information transmitted on resource(s) on which transmission is performed by the specific UE. Alternatively, even if one or more UEs belonging to the corresponding group perform decoding for information transmitted on resource(s) on which transmission is performed by the specific UE, one or more UEs belonging to the corresponding group may not perform a HARQ feedback operation, etc., for the transmitted information.

In this case, UEs in the corresponding group that decode the group unit information need to know which UE the configuration included in the group unit information is for. For this, a field configuration or a configuration rule for the group unit information may be pre-defined. Alternatively, the base station may (pre-)configure the field configuration or the configuration rule for group unit information to the UE through higher layer signaling and/or physical layer signaling. Alternatively, other UEs may (pre-)configure the field configuration or the configuration rule for group unit information to the UE through higher layer signaling and/or physical layer signaling.

Further, according to an embodiment of the present disclosure, in addition to a TPC configuration, a configuration corresponding to a priority and/or a QoS class may be applied to the group unit operation corresponding to a plurality of UEs. Through this, the pre-emption operation for a specific priority and/or a specific QoS class may be indicated.

According to an embodiment of the present disclosure, in case of performing pre-emption for sidelink transmission in communication between UEs, the base station or other UEs may instruct a specific UE not to transmit information on resource(s) reserved or being used by the specific UE. In this case, for the pre-emption operation, UE specific signaling or group-based signaling may be applied. Alternatively, for the pre-emption operation, the instruction may be implicitly performed through signaling defined in the system.

Therefore, according to an embodiment of the present disclosure, in case that the pre-emption operation for transmission of a UE is performed, the base station or other UEs may use existing signaling (e.g., power control signaling) as it is without using separate signaling. Thus, signaling overhead can be reduced. Furthermore, the UE can perform the pre-emption operation faster without being restricted by the timing applied to the existing signaling. In addition, by using the group unit information, the UE/base station can also perform an instruction to one or more UEs in the group at a time. Through this, an operation of the receiving UE can also be controlled. Furthermore, according to an embodiment of the present disclosure, it is possible to prevent a problem in which unnecessary HARQ feedback transmission occurs.

Figure 14:
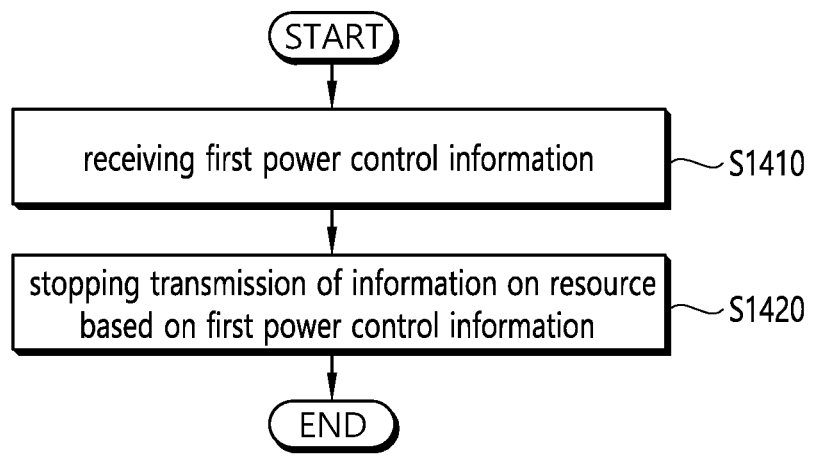
FIG. 14 shows a method for the UE to stop transmission of information according to an embodiment of the present disclosure.

FIG. 14 shows a method for the UE to stop transmission of information according to an embodiment of the present disclosure.

Referring to FIG. 14, in step S1410, a first UE may receive first power control information. The first power control information may be information for setting transmission power to zero. The first power control information may be received from a second UE. Alternatively, the first power control information may be received from a base station.

In step S1420, the first UE may stop the transmission of the information on a resource based on the first power control information. The resource may be a resource being used by the first UE. The resource may be a resource reserved by the first UE.

The transmission of the information may be immediately stopped upon receiving the first power control information. Alternatively, the transmission of the information may be stopped at a time shorter than a pre-configured time when the transmission power is changed. For example, the pre-configured time may be configured by the first UE. For example, the pre-configured time is received from a base station. The pre-configured time when the transmission power is changed may be a pre-configured time when a change of the transmission power is applied.

Additionally, the first UE may receive second power control information for setting transmission power to a non-zero value. In addition, the first UE may adjust the transmission power for the transmission of the information on the resource, based on the second power control information. The transmission power may be adjusted at a pre-configured time when the transmission power is changed. In addition, after the pre-configured time, the transmission of the information may be performed based on the adjusted transmission power.

The proposed method may be applied to the apparatus described below. For example, the wireless device (100) of FIG. 17 may be a first UE, and the wireless device (200) of FIG. 17 may be a second UE or a base station. The first UE may include at least one processor such as the processor (102), at least one memory such as the memory (104), and at least one transceiver such as the transceiver (106). Further, the second UE or the base station may include at least one processor such as the processor (202), at least one memory such as the memory (204), and at least one transceiver such as the transceiver (206).

First, the processor (102) of the first UE may control the transceiver (106) to receive first power control information. In addition, the processor (102) of the first UE may stop the transmission of the information on a resource based on the first power control information.

Figure 15:
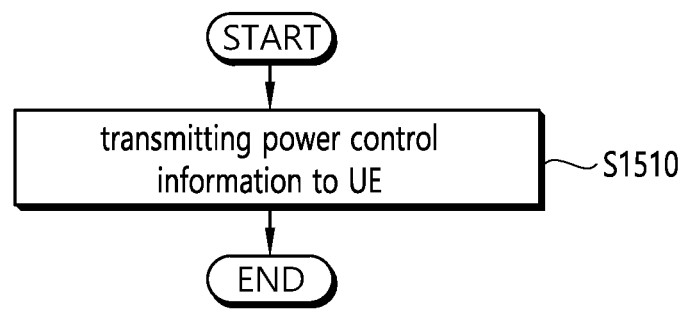
FIG. 15 shows a method for the base station to stop transmission of information by the UE according to an embodiment of the present disclosure.

FIG. 15 shows a method for the base station to stop transmission of information by the UE according to an embodiment of the present disclosure.

Referring to FIG. 15, in step S1510, the base station may transmit power control information to the UE. In this case, based on the power control information, the transmission of the information may be stopped on a resource by the UE.

Hereinafter, an apparatus to which the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
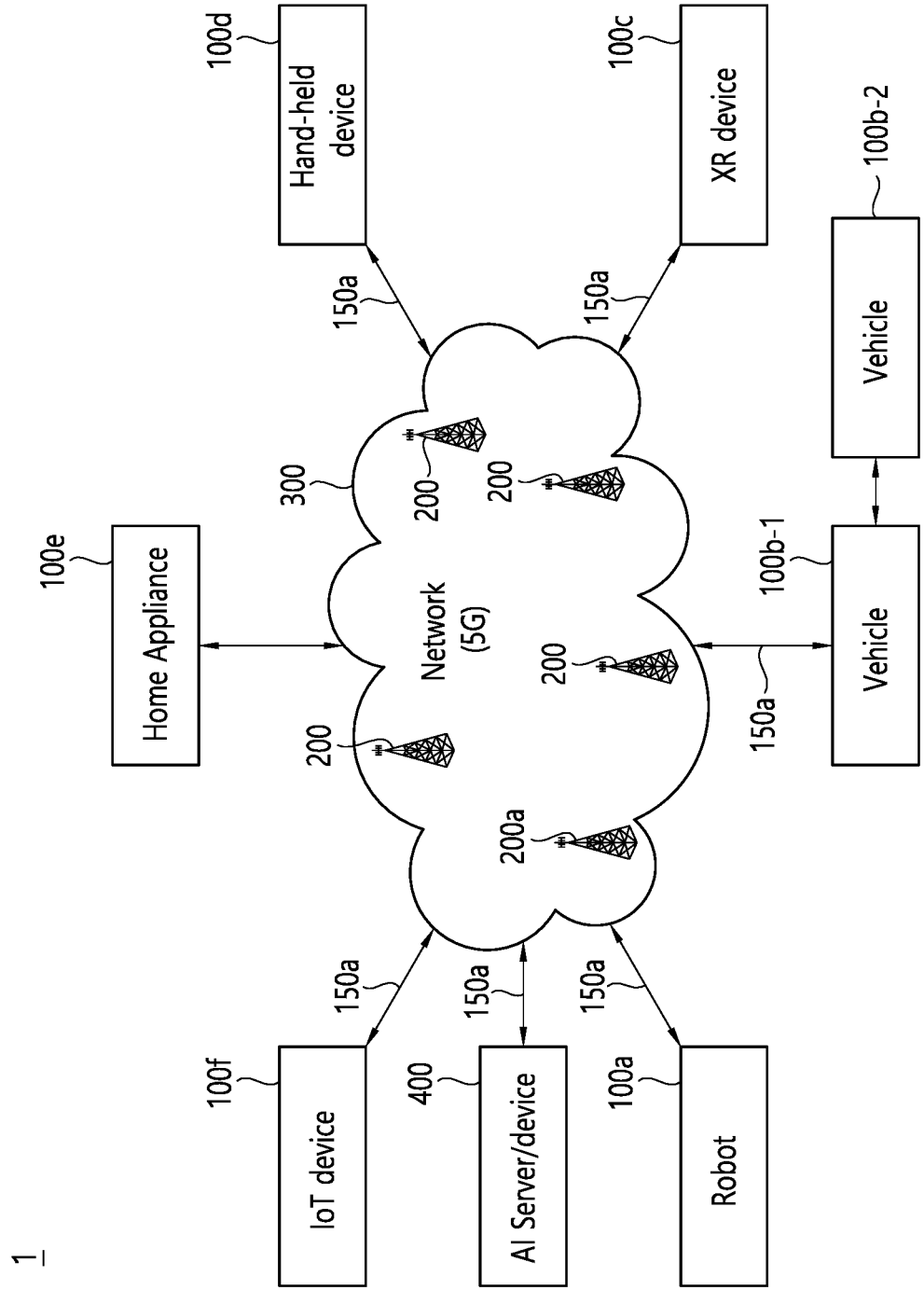
FIG. 16 shows a communication system (1) applied to the present disclosure.

FIG. 16 shows a communication system (1) applied to the present disclosure.

Referring to FIG. 16, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b) may be established between the wireless devices (100a~100f)/BS (200), or BS (200)/wireless devices (100a~100f). Herein, the wireless communication/connections (150a, 150b) may be established through various RATs (e.g., 5G NR) such as uplink/downlink communication (150a), sidelink communication (150b) (or, D2D communication), or inter BS communication (e.g., relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
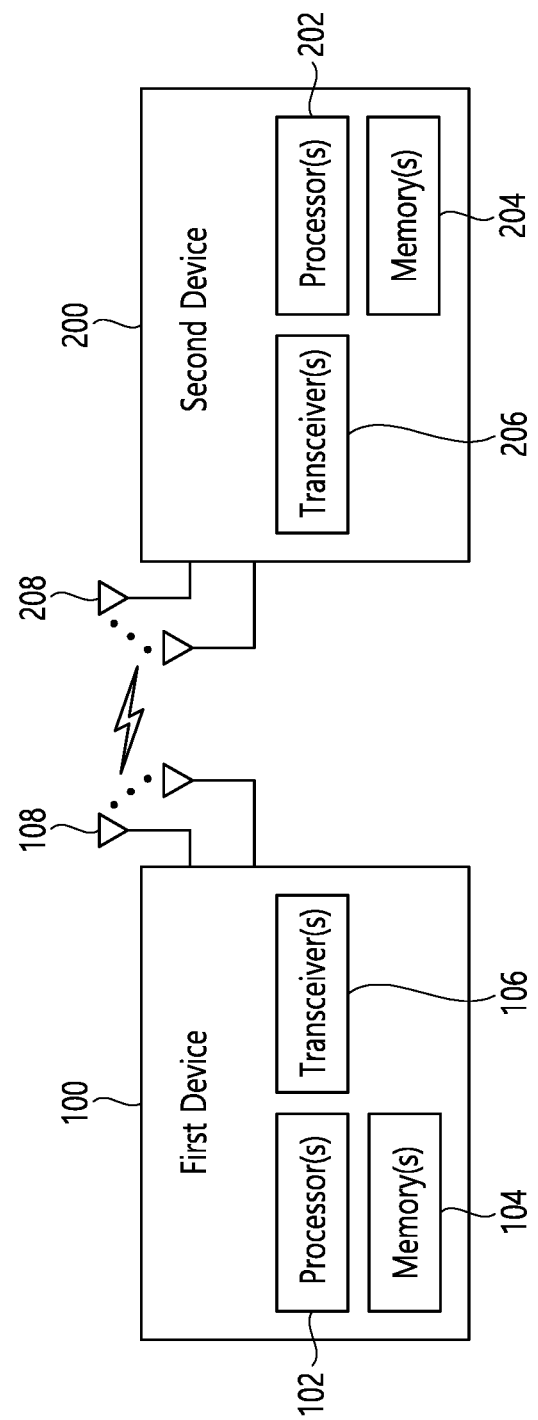
FIG. 17 shows wireless devices applicable to the present disclosure.

FIG. 17 shows wireless devices applicable to the present disclosure.

Referring to FIG. 17, a first wireless device (100) and a second wireless device (200) may transmit radio signals through a variety of RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 16.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/ signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Units (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 18:
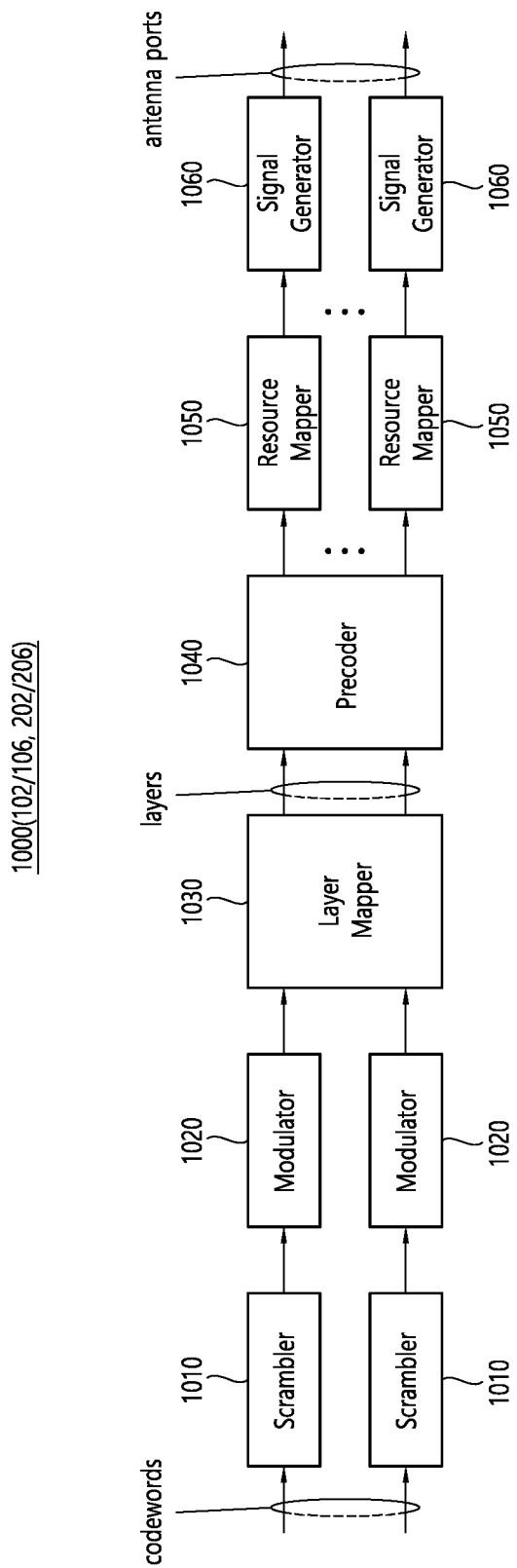
FIG. 18 shows a signal process circuit for a transmission signal.

FIG. 18 shows a signal process circuit for a transmission signal.

Referring to FIG. 18, a signal processing circuit (1000) may include scramblers (1010), modulators (1020), a layer mapper (1030), a precoder (1040), resource mappers (1050), and signal generators (1060). An operation/function of FIG. 18 may be performed, without being limited to, the processors (102, 202) and/or the transceivers (106, 206) of FIG. 17. Hardware elements of FIG. 18 may be implemented by the processors (102, 202) and/or the transceivers (106, 206) of FIG. 17. For example, blocks 1010~1060 may be implemented by the processors (102, 202) of FIG. 17. Alternatively, the blocks 1010 to 1050 may be implemented by the processors (102, 202) of FIG. 17 and the block 1060 may be implemented by the transceivers (106, 206) of FIG. 17.

Codewords may be converted into radio signals via the signal processing circuit (1000) of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 18. For example, the wireless devices (e.g., 100, 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
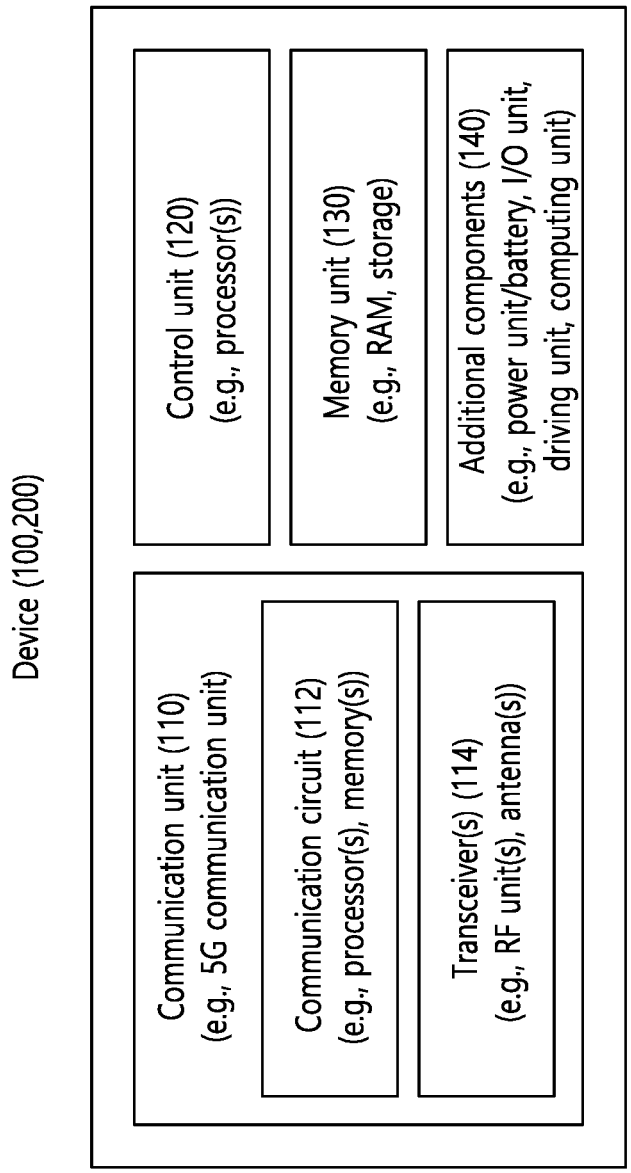
FIG. 19 shows another example of a wireless device applied to the present disclosure.

FIG. 19 shows another example of a wireless device applied to the present disclosure. The wireless device may be implemented in various forms according to a use-case/service (refer to FIG. 16 and FIGS. 20 to 25).

Referring to FIG. 19, wireless devices (100, 200) may correspond to the wireless devices (100, 200) of FIG. 17 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 17. For example, the transceiver(s) (114) may include the one or more transceivers (106, 206) and/or the one or more antennas (108, 208) of FIG. 17. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 16), the vehicles (100b-1, 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, and so on. The wireless device may be used in a mobile or fixed place according to a use-example/service.

In FIG. 19, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
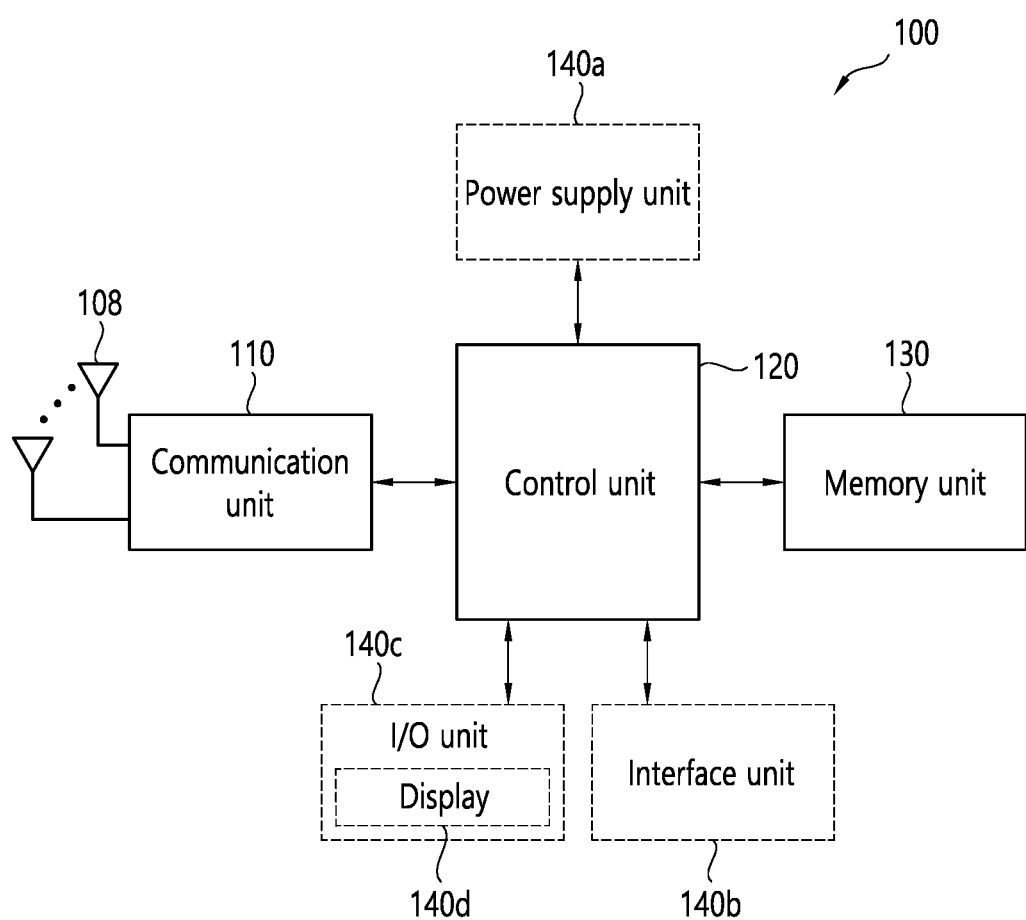
FIG. 20 shows a hand-held device applied to the present disclosure.

FIG. 20 shows a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110-130/140a-140c correspond to the blocks 110~130/140 of FIG. 19, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 21:
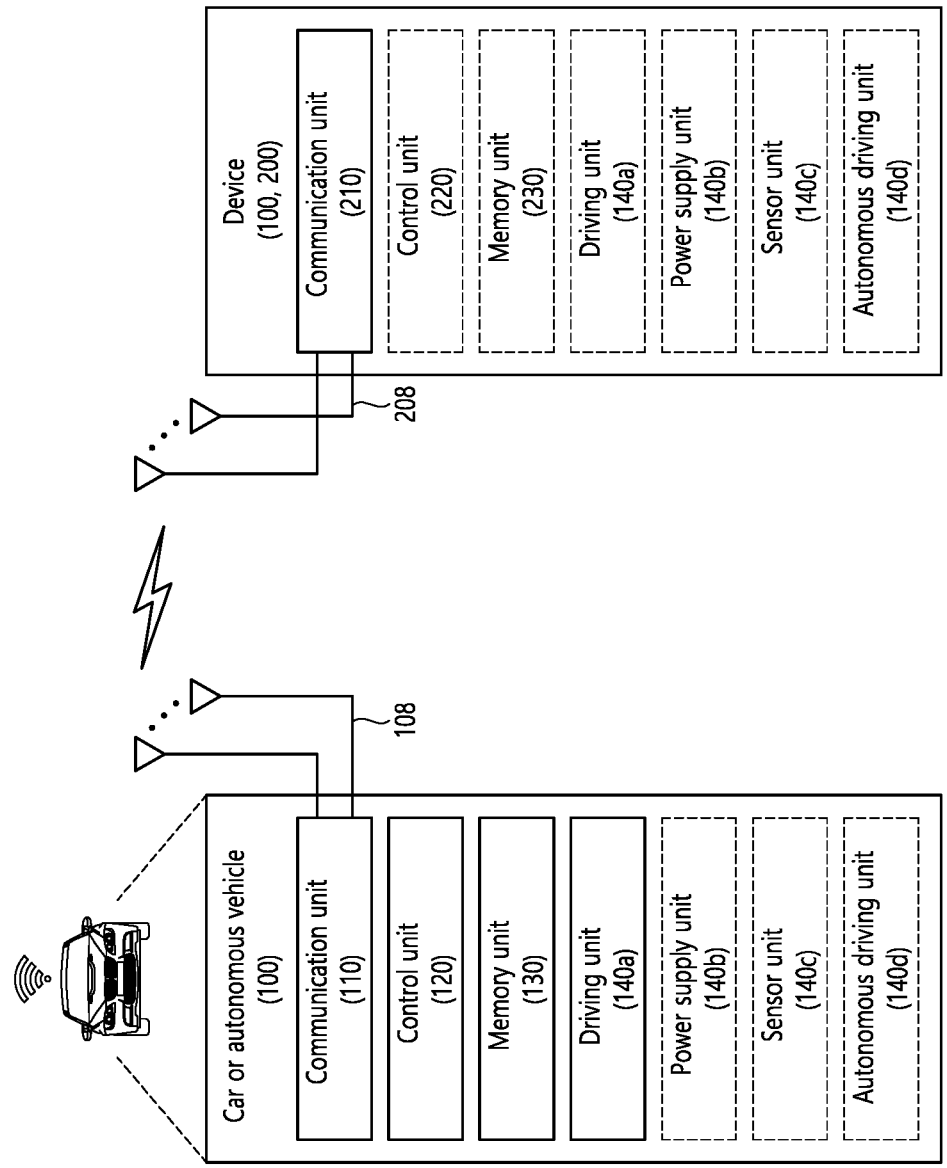
FIG. 21 shows a vehicle or an autonomous driving vehicle applied to the present disclosure.

FIG. 21 shows a vehicle or an autonomous driving vehicle applied to the present disclosure. The vehicle or autonomous driving vehicle may be implemented by a mobile robot, a car, a train, a manned/unmanned Aerial Vehicle (AV), a ship, and so on.

Referring to FIG. 21, a vehicle or autonomous driving vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a-140d correspond to the blocks 110/130/140 of FIG. 19, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous driving vehicle (100). The control unit (120) may include an Electronic Control Unit (ECU). The driving unit (140a) may cause the vehicle or the autonomous driving vehicle (100) to drive on a road. The driving unit (140a) may include an engine, a motor, a powertrain, a wheel, a brake, a steering device, and so on. The power supply unit (140b) may supply power to the vehicle or the autonomous driving vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous driving vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous driving vehicles and provide the predicted traffic information data to the vehicles or the autonomous driving vehicles.

Figure 22:
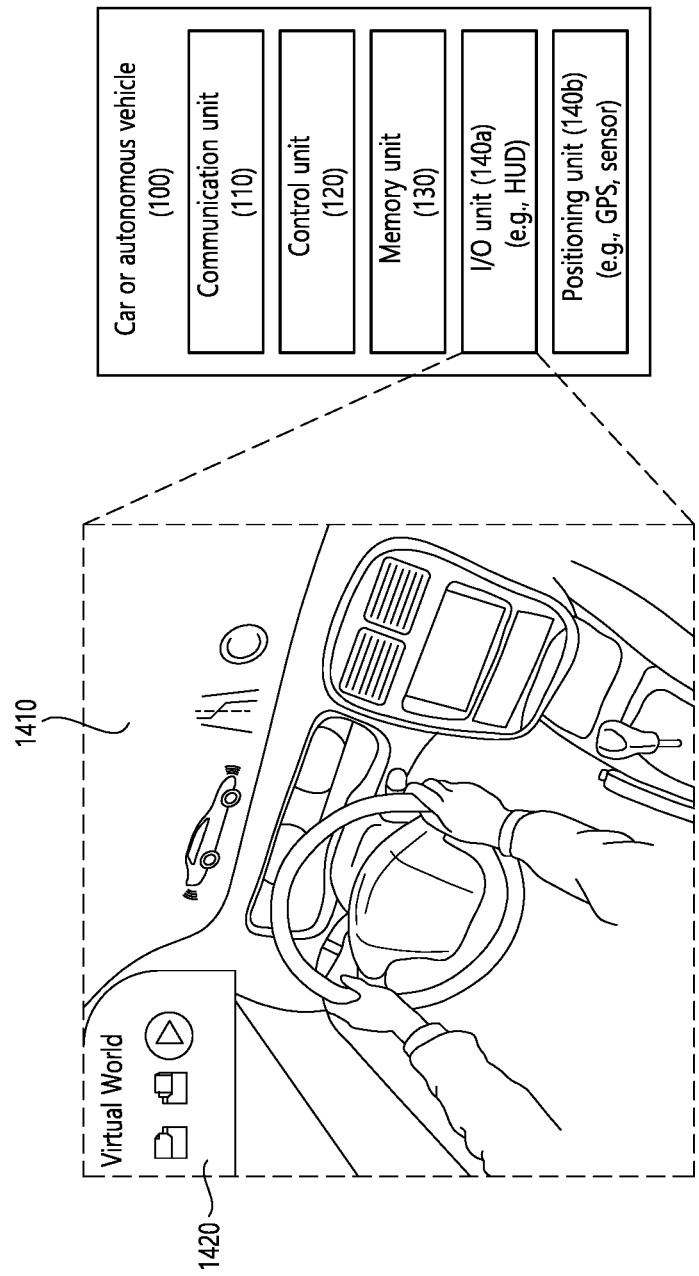
FIG. 22 shows a vehicle applied to the present disclosure.

FIG. 22 shows a vehicle applied to the present disclosure. The vehicle may be implemented as a transport means, an aerial vehicle, a ship, and so on.

Referring to FIG. 22, a vehicle (100) may include a communication unit (110), a control unit (120), a memory unit (130), an I/O unit (140a), and a positioning unit (140b). Herein, the blocks 110 to 130/140a~140b correspond to blocks 110 to 130/140 of FIG. 19.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include a HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormality to neighboring vehicles through the communication unit (110). According to situation, the control unit (120) may transmit the vehicle position information and the information on driving/vehicle abnormality to related organizations.

Figure 23:
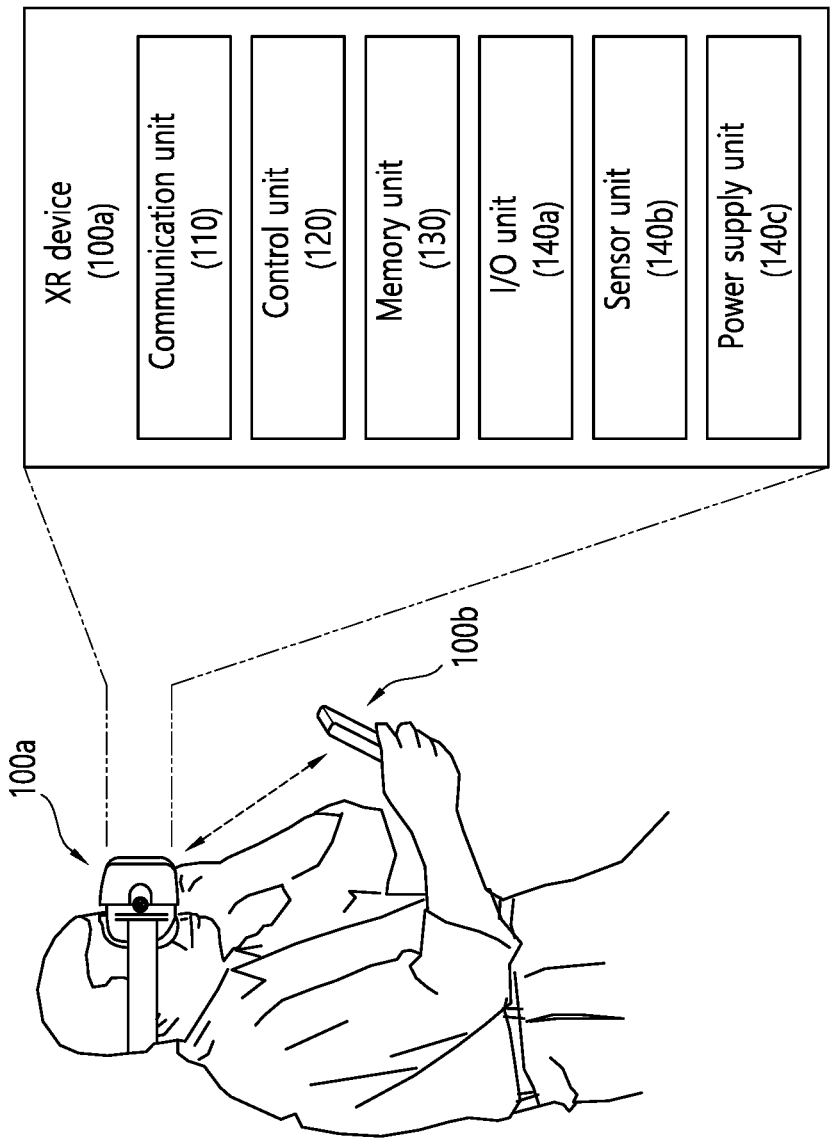
FIG. 23 shows an XR device applied to the present disclosure.

FIG. 23 shows an XR device applied to the present disclosure. The XR device may be implemented by an HMD, a HUD mounted in a vehicle, a television, a smartphone, a computer, a wearable device, a home appliance, a digital signage, a vehicle, a robot, and so on.

Referring to FIG. 23, an XR device (100a) may include a communication unit (110), a control unit (120), a memory unit (130), an I/O unit (140a), a sensor unit (140b), and a power supply unit (140c). Herein, the blocks 110 to 130/140a-140c correspond to the blocks 110 to 130/140 of FIG. 19, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, and so on. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, and so on.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device (100b)) or a media server through the communication unit (130). The communication unit (130) may download/stream content such as films or news from another device (e.g., the hand-held device (100b)) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 24:
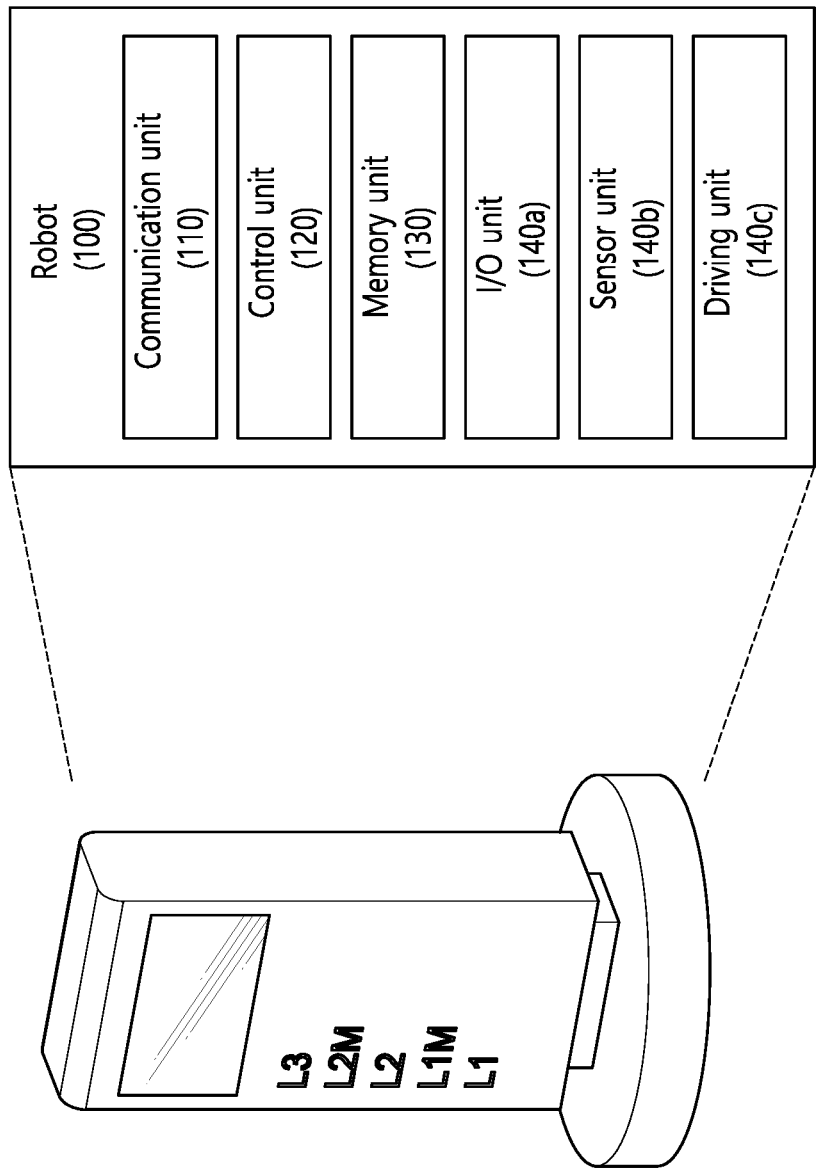
FIG. 24 shows a robot applied to the present disclosure.

FIG. 24 shows a robot applied to the present disclosure. The robot may be categorized into an industrial robot, a medical robot, a household robot, a military robot, and so on, according to a used purpose or field.

Referring to FIG. 24, a robot (100) may include a communication unit (110), a control unit (120), a memory unit (130), an I/O unit (140a), a sensor unit (140b), and a driving unit (140c). Herein, the blocks 110 to 130/140a-140c correspond to the blocks 110 to 130/140 of FIG. 19, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, and so on. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, and so on.

Figure 25:
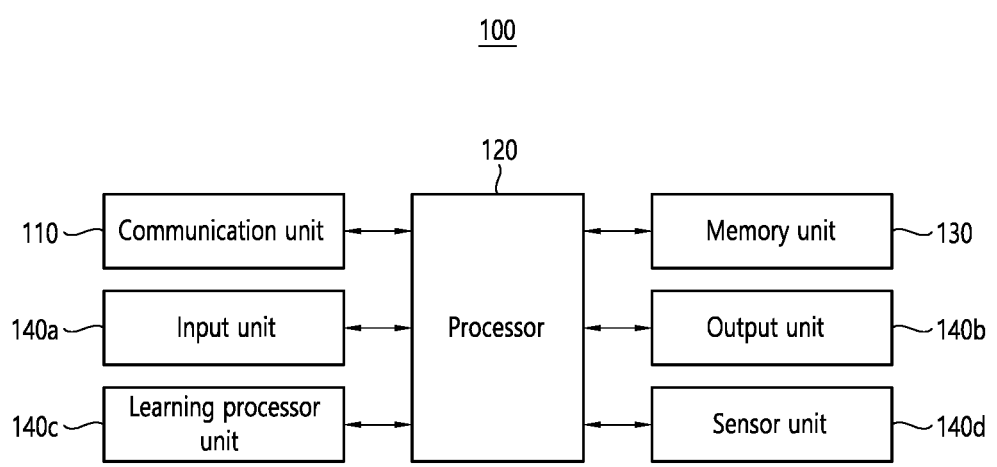
FIG. 25 shows an AI device applied to the present disclosure.

FIG. 25 shows an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 25, an AI device (100) may include a communication unit (110), a control unit (120), a memory unit (130), an I/O unit (140a/140b), a learning processor unit (140c), and a sensor unit (140d). The blocks 110 to 130/140a-140d correspond to blocks 110 to 130/140 of FIG. 19, respectively.

The communication unit (110) may transmit and receive wired/radio signals (e.g., sensor information, user input, learning models, or control signals) to and from external devices such as other AI devices (e.g., 100x, 200, 400 of FIG. 16) or an AI server (200) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 16). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 16). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

What is claimed is:

1. A method performed by a first device in a wireless communication system, the method comprising:
   receiving, from a second device, first information related to a first resource reserved by the second device, the first information including information related to a first transmission priority;
   receiving, from a third device, second information related to a second resource reserved by the third device, the second information including information related to a second transmission priority;
   determining the first resource and the second resource overlap in time and frequency; and
   transmitting conflict information through a physical sidelink channel,
   wherein based on the determination that the first resource and the second resource overlap in the time and the frequency, and based on that the second transmission priority is higher than the first transmission priority, the conflict information is transmitted to the second device,
   wherein, based on the determination that the first resource and the second resource overlap in the time and the frequency, and based on that the first transmission priority is higher than the second transmission priority, the conflict information is transmitted to the third device, and wherein, based on the determination that the first resource and the second resource overlap in the time and the frequency, and based on that the first transmission priority is equal to the second transmission priority, the conflict information is transmitted to either the second device or the third device.

2. The method of claim 1, wherein the conflict information represents a resource conflict between the first resource and the second resource.

3. The method of claim 1, wherein, based on the conflict information, transmission of the second device is skipped on the first resource.

4. The method of claim 1, wherein the first information reserved by the second device and the first transmission priority are received from the second device through physical layer signaling.

5. The method of claim 1, wherein the second information reserved by the third device and the second transmission priority are received from the third device through physical layer signaling.

6. The method of claim 1,
wherein the first resource is selected by the second device based on sensing, or allocated to the second device by a base station, and
wherein the second resource is selected by the third device based on sensing, or allocated to the third device by the base station.

7. The method of claim 1,
wherein, based on the determination that the first resource and the second resource overlap in the time and the frequency, and based on that the second transmission priority is higher than the first transmission priority, the conflict information is not transmitted to the third device, and
wherein, based on the determination that the first resource and the second resource overlap in the time and the frequency, and based on that the first transmission priority is higher than the second transmission priority, the conflict information is not transmitted to the second device.

8. A first device adapted to perform wireless communication, the first device comprising:
at least one transceiver;
at least one processor; and
at least one memory connected to the at least one processor and storing instructions that, based on being executed cause the first device to perform operations comprising:
receiving, from a second device, first information related to a first resource reserved by the second device, the first information including information related to a first transmission priority;
receiving, from a third device, second information related to a second resource reserved by the third device, the second information including information related to a second transmission priority;
determining the first resource and the second resource overlap in time and frequency; and
transmitting conflict information through a physical sidelink channel,
wherein, based on the determination that the first resource and the second resource overlap in the time and the frequency, and based on that the second transmission priority is higher than the first transmission priority, the conflict information is transmitted to the second device, wherein, based on the determination that the first resource and the second resource overlap in the time and the frequency, and based on that the first transmission priority is higher than the second transmission priority, the conflict information is transmitted to the third device, and wherein, based on the determination that the first resource and the second resource overlap in the time and the frequency, and based on that the first transmission priority is equal to the second transmission priority, the conflict information is transmitted to either the second device or the third device.

9. The first device of claim 8, wherein the conflict information represents a resource conflict between the first resource and the second resource.

10. The first device of claim 8, wherein, based on the conflict information, transmission of the second device is skipped on the first resource.

11. The first device of claim 8, wherein the first information reserved by the second device and the first transmission priority are received from the second device through physical layer signaling.

12. The first device of claim 8, wherein the second information reserved by the third device and the second transmission priority are received from the third device through physical layer signaling.

13. The first device of claim 8,
wherein the first resource is selected by the second device based on sensing, or allocated to the second device by a base station, and
wherein the second resource is selected by the third device based on sensing, or allocated to the third device by the base station.

14. A processing device adapted to control a first device, the processing device comprising:
at least one processor; and
at least one memory connected to the at least one processor and storing instructions that, based on being executed, cause the first device to perform operations comprising:
receiving, from a second device, first information related to a first resource reserved by the second device, the first information including information related to a first transmission priority;
receiving, from a third device, second information related to a second resource reserved by the third device, the second information including information related to a second transmission priority;
determining the first resource and the second resource overlap in time and frequency; and
transmitting conflict information through a physical sidelink channel,
wherein, based on the determination that the first resource and the second resource overlap in the time and the frequency, and based on that the second transmission priority is higher than the first transmission priority, the conflict information is transmitted to the second device,
wherein, based on the determination that the first resource and the second resource overlap in the time and the frequency, and based on that the first transmission priority is higher than the second transmission priority, the conflict information is transmitted to the third device, and
wherein, based on the determination that the first resource and the second resource overlap in the time and the frequency, and based on that the first transmission priority is equal to the second transmission priority, the conflict information is transmitted to either the second device or the third device.

15. The processing device of claim 14, wherein the conflict information represents a resource conflict between the first resource and the second resource.

16. The processing device of claim 14, wherein, based on the conflict information, transmission of the second device is skipped on the first resource.

17. The processing device of claim 14, wherein the first information reserved by the second device and the first transmission priority are received from the second device through physical layer signaling.

18. The processing device of claim 14, wherein the second information reserved by the third device and the second transmission priority are received from the third device through physical layer signaling.

* * * * *